United States Patent
Li et al.

(10) Patent No.: US 10,397,001 B2
(45) Date of Patent: Aug. 27, 2019

(54) SECURE MECHANISM FOR SUBSIDY LOCK ENFORCEMENT

(71) Applicant: Apple Inc., Cupertino, CA (US)

(72) Inventors: Li Li, Los Altos, CA (US); Arun G. Mathias, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 140 days.

(21) Appl. No.: 15/691,399

(22) Filed: Aug. 30, 2017

(65) Prior Publication Data
US 2018/0062853 A1 Mar. 1, 2018

Related U.S. Application Data

(60) Provisional application No. 62/382,125, filed on Aug. 31, 2016.

(51) Int. Cl.
*H04L 29/06* (2006.01)
*H04L 9/32* (2006.01)
(Continued)

(52) U.S. Cl.
CPC ............ *H04L 9/3247* (2013.01); *H04L 9/006* (2013.01); *H04L 9/14* (2013.01); *H04L 9/30* (2013.01);
(Continued)

(58) Field of Classification Search
CPC ......... H04L 9/3247; H04L 9/006; H04L 9/14; H04L 9/30; H04L 9/3234; H04L 9/3271;
(Continued)

(56) References Cited

U.S. PATENT DOCUMENTS 6,321,079 B1 * 11/2001 Cooper ................. H04W 8/183
455/410
6,799,155 B1 * 9/2004 Lindemann ........... H04W 8/183
455/558
(Continued)

OTHER PUBLICATIONS

A Global Initiative (3GPP), "3rd Generation Partnership Project; Technical Specification Group Services and System Aspects; Personalisation of Mobile Equipment (ME); Mobile functionality specification (Release 13)", Jan. 2016, 23 pgs.
(Continued)

*Primary Examiner* — Ghodrat Jamshidi
(74) *Attorney, Agent, or Firm* — Dickinson Wright RLLP

(57) ABSTRACT

A malicious party may attempt to avoid a mobile network operator (MNO) contract involved with subsidy-lock by inserting an interfering piece of hardware called a proxy SIM in a device. The device provided herein uses an authentication technique to guard against a proxy-SIM attack. The device includes a secure element (SE) with subscriber identity module (SIM) functionality present on the SE. The device sends the SE a nonce to be signed over. The SE signs using a public key infrastructure (PKI) private key of the SE and provides a response. The device evaluates whether the response contains a valid signature. If the validation is successful, the device relies on SIM data provided in the response to continue with activation of the device, so that the device can provide services under the MNO contract. If the validation fails, the device will not attempt to access network services with the SIM functionality.

19 Claims, 13 Drawing Sheets

(51) Int. Cl.
*H04M 15/00* (2006.01)
*H04L 9/00* (2006.01)
*H04L 9/14* (2006.01)
*H04L 9/30* (2006.01)
*H04W 12/06* (2009.01)
*H04W 12/12* (2009.01)
*H04W 4/24* (2018.01)
*H04W 12/04* (2009.01)

(52) U.S. Cl.
CPC .......... *H04L 9/3234* (2013.01); *H04L 9/3271* (2013.01); *H04L 63/0876* (2013.01); *H04M 15/47* (2013.01); *H04M 15/48* (2013.01); *H04W 4/24* (2013.01); *H04W 12/06* (2013.01); *H04W 12/12* (2013.01); *H04L 2209/80* (2013.01); *H04M 2215/0148* (2013.01); *H04M 2215/0156* (2013.01); *H04W 12/04* (2013.01)

(58) Field of Classification Search
CPC ............ H04L 63/0876; H04L 2209/80; H04M 15/47; H04M 15/48; H04M 2215/0148; H04M 2215/0156; H04W 4/24; H04W 12/06; H04W 12/12; H04W 12/04
See application file for complete search history.

(56) References Cited

U.S. PATENT DOCUMENTS

| | | | | |
|---|---|---|---|---|
| 2003/0182560 | A1* | 9/2003 | Brizek | G06F 12/145 713/189 |
| 2008/0003980 | A1* | 1/2008 | Voss | H04L 63/0853 455/411 |
| 2010/0169660 | A1* | 7/2010 | Voss | H04L 63/06 713/183 |
| 2012/0260095 | A1* | 10/2012 | Von Hauck | H04L 9/3228 713/176 |
| 2015/0126153 | A1* | 5/2015 | Spitz | H04M 1/675 455/411 |
| 2016/0094991 | A1* | 3/2016 | Powell | H04W 12/06 455/411 |
| 2016/0234176 | A1* | 8/2016 | Chu | H04L 63/0428 |
| 2016/0309327 | A1* | 10/2016 | Grimault | H04L 63/123 |
| 2017/0064552 | A1* | 3/2017 | Park | H04W 12/06 |

OTHER PUBLICATIONS

A Global Initiative (3GPP), "3rd Generation Partnership Project; Technical Specification Group Core Network and Terminals; Universal Subscriber Identity Module (USIM) Application Toolkit (USAT) (Release 13)", Jun. 2016, 137 pgs.

GSM Association; Official Document SGP.21, "RSP Architecture", Version 1.0, Dec. 23, 2015, 52 pgs.

GSM Association; Official Document SGP.22, "RSP Technical Specification", Version 1.1, Jun. 9, 2016, 125 pgs.

Altaf Shaik, et al., "Practical Attacks Against Privacy and Availability in 4G/LTE Mobile Communication Systems", Technische Universifat Berlin and Telekom Innovation Laboratories, Feb. 11, 2016, 16 pgs.

* cited by examiner

SECURE MECHANISM FOR SUBSIDY LOCK ENFORCEMENT

CROSS-REFERENCE TO RELATED APPLICATIONS

This application claims benefit of U.S. Provisional Patent Application No. 62/382,125 entitled "A SECURE MECHANISM FOR SUBSIDY LOCK ENFORCEMENT," filed Aug. 31, 2016, which is hereby incorporated by reference.

FIELD

The described embodiments relate to guarding against a subsidy lock attack.

BACKGROUND

Mobile network operators (MNOs) sometimes use a business model of offering a wireless device to a buyer at a discounted price bundled with a service contract; this bundling is known as subsidy lock. The dollar value of the wireless device on the open market is higher than the discounted price. A person attempting to defeat the subsidy lock may be referred to as an attacker.

Universal integrated circuit cards (UICCs) and embedded UICCs (eUICCs) are secure elements (SEs) for hosting profiles. A profile is a combination of operator data and applications provisioned on an SE in a device for the purpose of providing services by an operator, for example, an MNO. A profile can be identified by a unique number called an ICCID (Integrated Circuit Card Identifier). A wireless operator is a company providing wireless cellular network services. An MNO is an entity providing access capability and communication services to its subscribers through a mobile network infrastructure. A wireless device may also be referred to herein as simply a device. An end user or customer is a person using a device. An enabled profile can include files and/or applications which are selectable over an SE-device interface. To use the device, the profile is activated with the MNO. Two documents related to activation of profiles are GSM Association document GSMA SGP.22: "RSP Technical Specification," Version 1.1 Jun. 9, 2016 (hereinafter "SGP.22"), and 3GPP 22.022: "Personalisation of Mobile Equipment (ME); Mobile functionality specification," Version 13.0.0 January 2016. Device manufacturers may also use proprietary methods to activate profiles (physical SIMs/eSIMs). A document related to communications generated by an SE is 3GPP 31.111: "Universal Subscriber Identity Module (USIM) Application Toolkit (USAT)," Version 13.4.0, June, 2016 (hereinafter "3GPP 31.111"). A document related to communications with an SE is ETSI TS 102.221: "Smart Cards; UICC-Terminal interface; Physical and logical characteristics," Version 8.2.0, June, 2009 (hereinafter "ETSI 102.221").

A goal of the attacker is to activate the wireless device with an MNO using a subscriber identity module (SIM) not approved under the service contract. SIM functionality is achieved in wireless devices in a number of ways using secure elements (SEs). For example, SIM functionality can be achieved by building the SIM functionality into an SE or by provisioning an SE with a profile, for example, after an end user obtains the wireless device. In the latter case, the SIM functionality is provided by a profile known as an eSIM. In some instances, the SE is a removable UICC that is placed in a SIM tray in the wireless device before the wireless device is used with MNO services. SIM functionality is provided herein by profiles, and a profile may be realized either with a physical SIM or with an eSIM.

In order to begin using the services of an MNO by activating the device, the device needs be registered in a home location register (HLR) of the serving MNO and the profile in the device needs to be enabled.

During activation, the baseband processor may communicate with an SE in the SIM tray of the wireless device. The SE has a hardware interface (I/F) that matches with a hardware I/F of the wireless device in order to support communication. An attacker may attempt to break the subsidy lock by inserting a specially designed circuit board with a computer chip, the board and chip known as a proxy SIM, between the SE I/F and the SIM tray I/F.

SUMMARY

Representative embodiments set forth herein disclose various systems and techniques for guarding against a subsidy lock attack. Embodiments described herein reduce the likelihood that an attacker can trick a device to perform outside the bounds of a service contract.

MNOs sometimes use a subsidy lock business model of offering a wireless device to a buyer at a discounted price bundled with a service contract. When an end user attempts to activate the device with the MNO that provided the device to the buyer with the contract, locking software in the device can query a SIM present on an SE of the device to determine whether the SIM qualifies within the terms of the service contract. If the locking software recognizes the device as locked to a particular MNO, and the SIM present on the device is not associated with the particular MNO, the device will not complete the activation attempt.

An attacker may intercept and interfere with device signals using the small circuit board known as a proxy SIM. Embodiments described herein guard against proxy SIM-based subsidy lock attacks. The designer of the proxy SIM is familiar with device signaling messages and timing, and designs the proxy SIM to inject fake lock-related information into a specific device-SE communication.

Embodiments described herein provide an SE that supports cryptographic signing to guarantee the integrity of SIM information, for example, an International Mobile Subscriber Identity (IMSI) value, provided to the locking software of the device or to the activation server. The proxy SIM is unable to fake the response portion when injecting the bogus information into the SE-device communication described herein. The proxy SIM attack fails because the proxy SIM does not have access to the private key of the SE. In some embodiments, the locking software in the device is configured to detect and reject the attempted activation. In some embodiments, an activation server is configured to detect and reject the attempted activation. By means of embodiments disclosed herein, a contracting MNO can preserve its prerogative to serve a device sold with a service contract according to the terms of that contract.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing calls and other communications between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
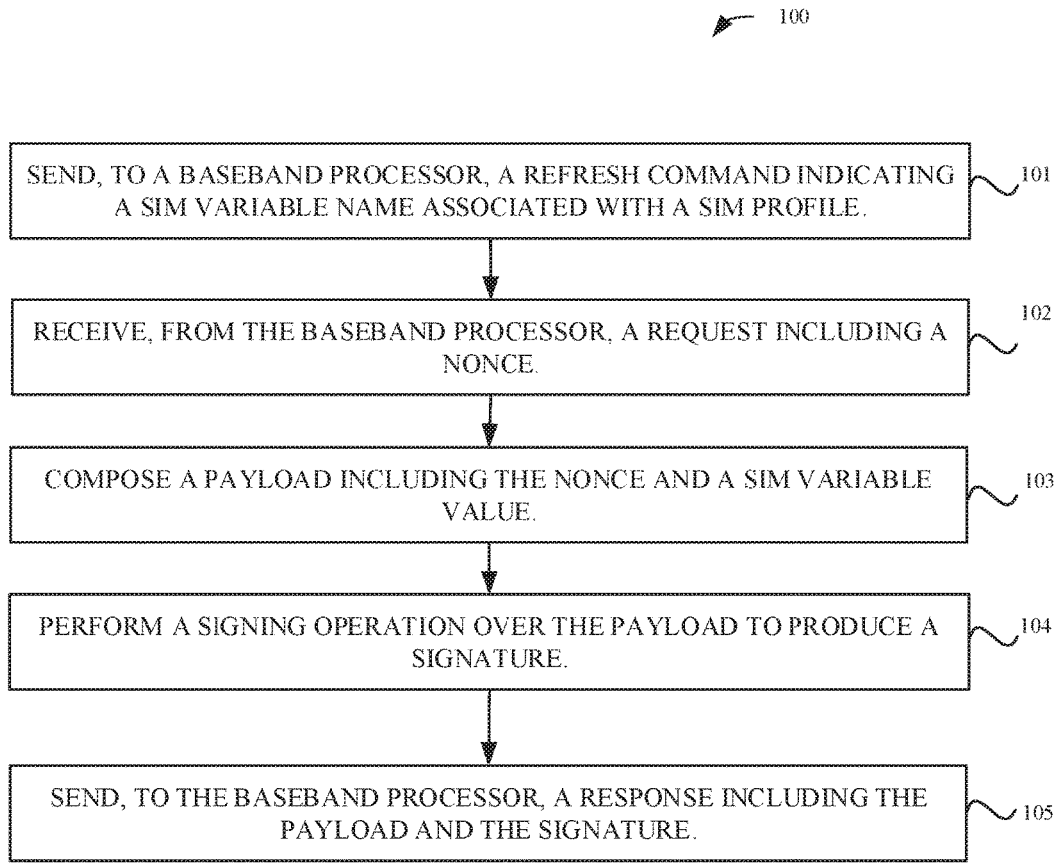
FIG. 1 illustrates exemplary logic for an SE sending a refresh command and performing a signing operation, according to some embodiments.

Representative applications of apparatuses, systems, and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

As mentioned above, mobile network operators sometimes use a business model of offering a discounted wireless device bundled with a service contract. An end user obtains the wireless device and agrees to subscribe to service with the MNO for a fixed period of time. This MNO may be referred to as a contracting MNO. The contracting MNO is carrying, or subsidizing, some part of the actual wireless device cost. The wireless device manufacturer includes locking software in the wireless device to restrict the wireless device to only attach with a network provided by the contracting MNO using a qualifying SIM; this software-implemented restriction is called a SIM lock, network lock, or subsidy lock. The locking software, in some cases, is implemented in a baseband component or a baseband processor of the device.

The wireless device itself has a higher value on the open market than the discounted price, as mentioned above. A person wishing to sell the wireless device to a second buyer for use outside the contracted terms may first attempt to defeat the subsidy lock so that the second buyer can use the wireless device, with a non-qualifying SIM on the network of the contracting MNO, but without having signed a contract. The person attempting to defeat the locking software is an example of an attacker. If the attacker is successful, the second buyer obtains a wireless device at a reduced cost and has not committed to a contract. Embodiments described herein reduce the likelihood that an attacker, wishing to obtain service for a device with a SIM not qualified with a contract, can deceive the locking software. In particular, embodiments described herein reduce the likelihood that the attacker can deceive the locking software into activating the device on the network of the contracting MNO with the non-qualifying SIM.

The software-implemented restriction can be based on the wireless device, herein also referred to as the device, reading lock-related information from a SIM on the device. The lock-related information can be, for example, an IMSI value, an ICCID value of the SIM, a GID1 value, and/or a GID2 value. The IMSI value includes MCC and MNC values. For example, the locking software may be programmed to restrict activation of a SIM present on the SE in the device with an activation server associated with a certain MNO in a certain country (or country region) as indicated by an MCC, MNC pair. GID1 and/or GID2 values may also be involved in some cases. The device thus makes a decision as to whether to allow activation to proceed based on information in the SIM present on the SE in the device. If the lock-related information indicates that the SIM is a qualifying SIM, then the locking software sets state in device memory indicating that a qualifying SIM is installed in the SE.

When an end user attempts to activate the device with the contracted MNO, the locking software can query whatever SIM is present on the SE in the device to learn one or more of the IMSI, ICCID, GID1, and/or GID2 values of the SIM. If the locking software recognizes the device as locked to the contracted MNO, and the IMSI value returned by the query is not associated with the contracting MNO, the device will not perform network signaling needed to activate the device with the activation server of the contracting MNO.

An attacker may intercept and interfere with device signals using a proxy SIM, as mentioned above. A proxy SIM can be a small circuit board, with a chip at the top, with the small circuit board being in the shape of a regular SIM package. The attacker inserts the proxy SIM into the device card tray between metallic pads of the wireless device, that is, the SIM hardware interface of the device, and the corresponding metallic pads of the regular SIM package of a non-qualifying SIM. The regular SIM package referred to here is the SE. The SE, by the way, may be an SE such as a removable UICC. An eSIM may be present on the UICC. In some cases, complete SIM functionality is built into the UICC at the UICC manufacturer (that is, the UICC has SIM functionality without use of an eSIM). In some cases the SE is an eUICC and the attacker must first un-embed the eUICC before inserting the proxy SIM.

The designer of the proxy SIM, the attacker or someone associated with the attacker, is familiar with device signaling messages and timing, and designs the proxy SIM to substitute fake lock-related information in response to the query for SIM information from the device in order to deceive too-trusting conventional locking software. Such a response may be referred to as a faked response, and the fake lock-related information may be referred to as bogus information injected into a device-SE communication.

Embodiments described herein guard against proxy SIM-based subsidy lock attacks by providing a verifiable cryptographic signature.

Before the device is used with the proxy SIM, a non-qualifying SIM and the proxy SIM are inserted into the SIM tray of the device. An example of an attack using the proxy SIM then may proceed as follows: i) a device trigger is received, for example, over a user interface, to attempt activation of the device, ii) the device sends a query as an information request to the SE, iii) the proxy-SIM recognizes the query and composes a response based on bogus lock-related information, for example, a bogus IMSI value, that the attacker believes the locking software will approve, iv) the proxy-SIM imposes a faked response based on the bogus information on the SIM hardware interface of the device, v) the locking software, unwittingly, trusts the faked response and updates lock-state memory settings to indicate that a qualifying SIM is present on the SE in the device, and to indicate that the SIM is enabled, vi) the attacker designs the proxy SIM software to use a UICC proactive command, for example, to send a refresh command to the device, to cause actual SIM-identifying information of the non-qualifying SIM present on the SE to be fetched by the device, vii) the baseband processor of the device responds to the refresh command by reading information, for example, an IMSI value, from the non-qualifying SIM (the proxy SIM metaphorically stands aside and does not interfere with this event), and viii) the end user is now able to attach improperly to the contracting MNO using a non-qualifying SIM and without signing a contract with the contracting MNO.

As mentioned above, embodiments described herein guard against the proxy-SIM attack by providing an SE that supports cryptographic signing to guarantee the integrity of SIM information, for example, an IMSI value, provided to the locking software of the device. In some embodiments, the cryptographic signing is done using PKI techniques. The device trusts a certificate issuer (CI) and the CI has signed a certificate for the SE. Using a PKI technique, the SE is associated with a public key-private key pair, and the public key is available to the device in the certificate signed by the CI. The device, in some embodiments, performs a challenge-response sequence with the SE while obtaining the lock-related information. The proxy SIM is unable to fake the response portion when injecting the bogus information into the SE-device communication.

Specifically, some embodiments described herein guard against a proxy SIM attack; an example event sequence includes: i) an activation triggering event occurs, ii) the device sends a query, including a nonce, as an information request to the SE, iii) the proxy SIM recognizes the query and composes a faked response based on bogus lock-related information, for example, a bogus IMSI value, that the attacker believes the locking software will approve; the proxy SIM may or may not attempt to append a cryptographic signature to the faked response, iv) the proxy SIM imposes the faked response on the SIM hardware interface of the device, v) the locking software, suspiciously, checks for a signature on the faked response, vi) there is no signature, or there is a signature that is unrelated to the private key of the SE related to the public key found in the certificate signed by the CI, and vii) the locking software rejects the attempted activation due to a failed verification attempt of a cryptographic signature on the SE response to the device information request. The contracting MNO has preserved its prerogative to serve only a device having an SE with a qualifying SIM present on the SE.

In some embodiments, the challenge-response is initiated by the activation server. When the server provides a nonce and receives in return SIM information and the nonce with a cryptographic signature created with the private key of the SE, the activation server is able to trust the SIM information and proceed with the activation. If the server receives SIM information with no signature or with a signature not verifiable based on the certificate of the SE, then the activation server does not proceed with the activation.

Some information related to eSIM provisioning, SEs, and PKI techniques is provided here.

SIM Functionality

A wireless device uses an SE that includes SIM functionality. The SE may be a UICC or an eUICC. The SIM functionality may be built into the SE or be downloaded to the SE as an eSIM. The SE may be removable from the wireless device (e.g. a UICC) or it may be not easily removable (e.g. an eUICC). An eSIM is an electronic SIM.

A physical SIM, which is an SE, can be an electronic card, which can be inserted into a SIM tray of the wireless device. A profile contains information such as files, applets, and unique subscriber information such as an IMSI. A profile may be personalized when a physical SIM is produced or provisioned in the field on a UICC or eUICC in the format of an eSIM.

An SE includes an operating system, and the operating system can include ability to provide authentication algorithms to network access applications associated with a given operator. A security domain within an SE contains the operator's over the air (OTA) keys and provides a secure OTA channel. OTA keys are credentials used by an operator for remote management of operator profiles on an SE.

Public Key Infrastructure (PKI) Techniques

Communications of an SE may be authenticated using PKI techniques. Certificates used for authentication and confidentiality purposes can be generated by a CI. A public-key certificate may also be referred to herein simply as a certificate.

A user may store a copy of a certificate, where the certificate holds the name of a given party (user identity). The PKI public key recorded in the certificate can be used to check the signature on a message signed using the corresponding PKI private key of the given party.

Authentication Logic

FIG. 1 illustrates exemplary logic 100 for guarding against a proxy SIM attack, according to some embodiments. The starting conditions of the exemplary logic 100 include the baseband processor configured to use a profile on a secure element for limited but not regular operations. A limited operation includes contacting an MNO server. An example of a regular operation is providing voice or data services to an end user based on the profile. At 101, an SE sends to a baseband processor of the device housing the SE, a refresh command indicating a SIM variable name associated with a SIM profile. For example, the refresh command may refer to an IMSI variable. At 102, the SE receives a request from the baseband processor including a nonce. A nonce, in some embodiments, is a pseudorandom variable generated in real time as needed to guard against replay attacks. At 103, the SE composes a payload including the nonce and a SIM variable value corresponding to the SIM variable name of the request. At 104, the SE performs a signing operation over the payload to produce a signature. At 105, the SE sends the payload and signature to the baseband processor. The baseband processor confirms the signature (not shown in FIG. 1), and, upon successful validation, proceeds to use the profile for regular cellular operations.

Device

Figure 2:
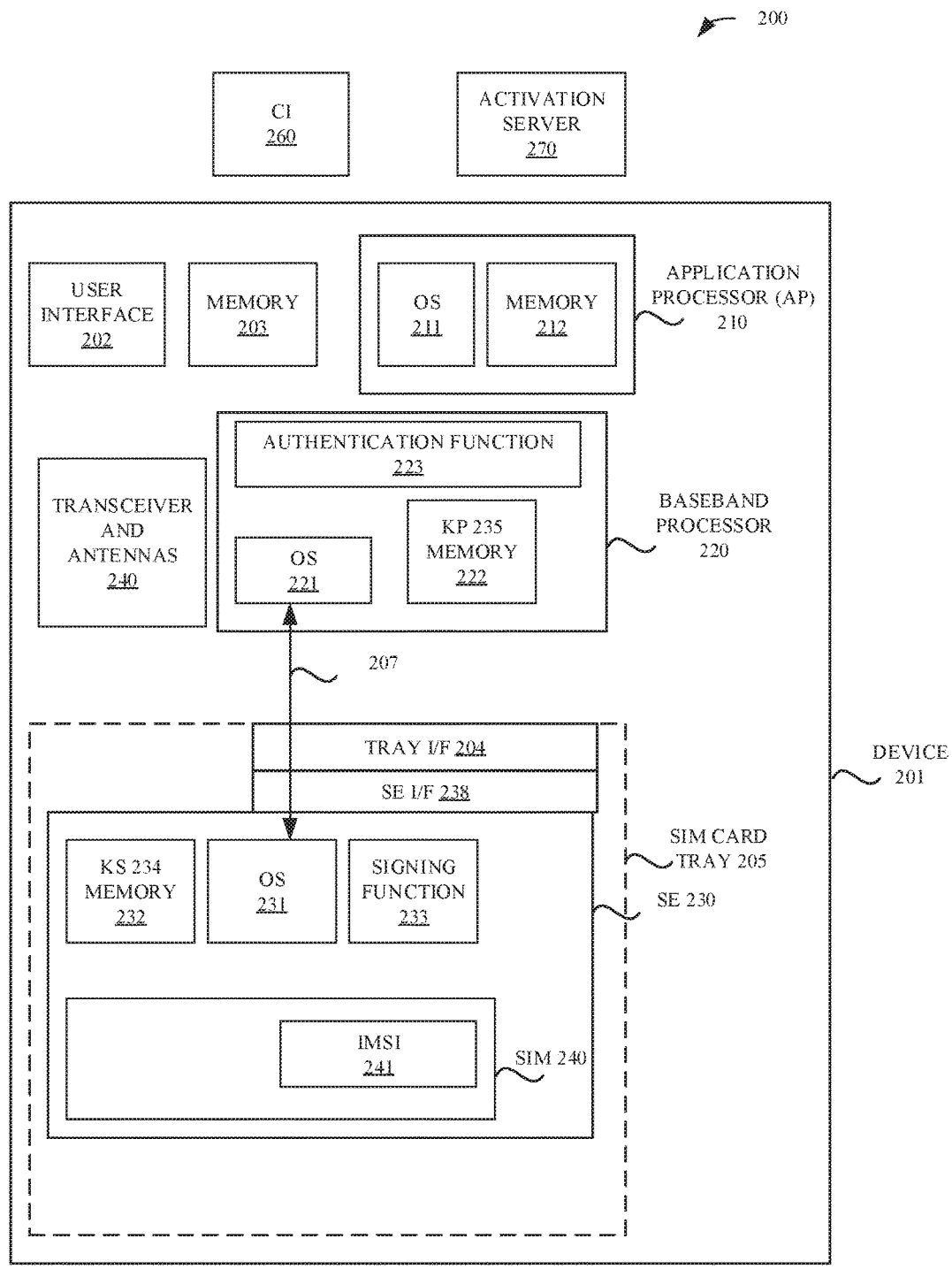
FIG. 2 illustrates and exemplary system, including a device with a SIM tray, a baseband processor with an authentication function, and an SE with a signing function, according to some embodiments.
Figure 4:
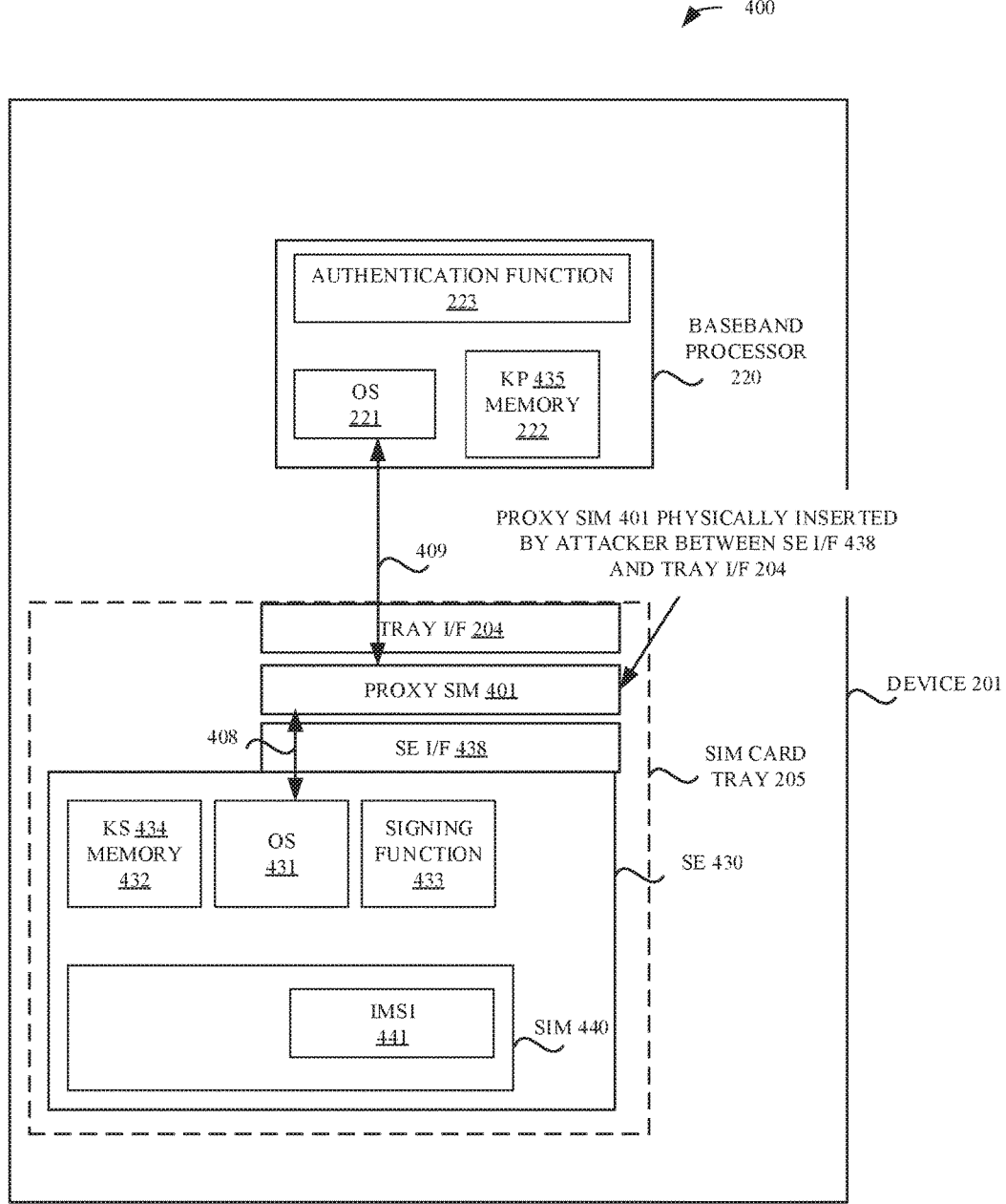
FIG. 4 illustrates an attack on the system of FIG. 2 in which an attacker has inserted a proxy SIM into the device of FIG. 2.

FIG. 2 illustrates an exemplary system 200 including a CI 260, an activation server 270 and a device 201, according to some embodiments. The device 201 houses an SE 230 in a SIM card tray 205. The device includes a user interface 202, a memory 203, an application processor (AP) 210, a baseband processor 220, and a transceiver and antennas indicated as reference numeral 240. The AP includes an OS 211 and a memory 212. The baseband processor 220 includes an authentication function 223 (which may be realized in software), an operating system (OS) 221 and a memory 222. Within the memory is a public key, KP 235, of the SE 230. The baseband processor, in some embodiments, uses KP 235 to test cryptographic signatures apparently created by the SE 230. The SE 230 includes a signing function 233 (which may be realized in software), an OS 231, a memory 232 and SIM functionality indicated as SIM 240. The memory 232 holds a private key KS 234 corresponding to the public key KP 235. The signing function 233, in some embodiments, signs, using the private key KS 234 over a payload including a nonce to produce a cryptographic signature. The SIM 240 is associated with an IMSI 241. The SE 230 has a hardware interface, such as copper pads and traces, represented as SE I/F 238. SE I/F 238 makes contact with a hardware interface I/F 204 of the SIM card tray 205. For example, SE I/F 238 contacts tray I/F 204 and by this means electrical signals 207 from/to the SE 230 pass to/from communication buses and processors such as baseband processor 220 of the device 201. FIG. 4 will illustrate a situation in which a proxy SIM interferes with the signals 207.

Authentication Message Flow

Figure 3:
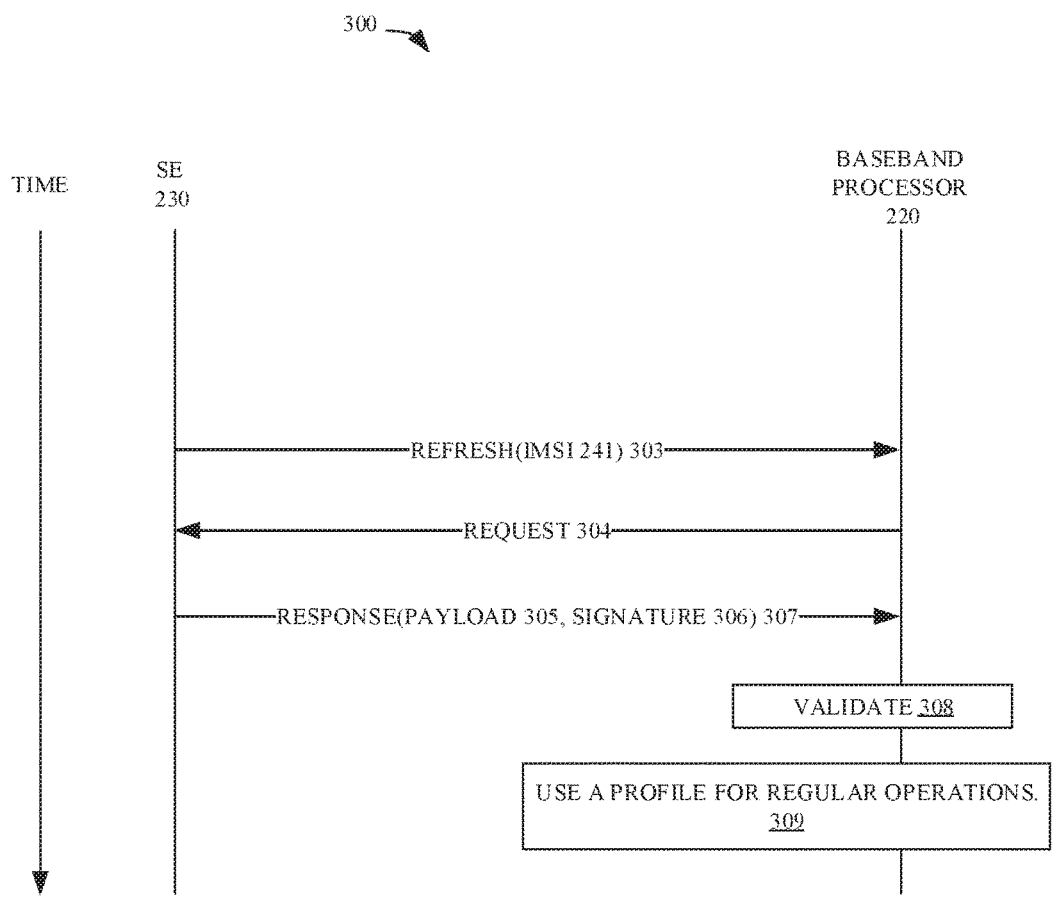
FIG. 3 illustrates an exemplary message flow for an SE sending a refresh command and performing a signing operation, according to some embodiments.

FIG. 3 illustrates an exemplary message flow 300, according to some embodiments. Time is indicated by a time line on the left, with time advancing from top to bottom in the figure. The entities communicating in FIG. 3 are indicated with labels across the top of the figure. SE 230 sends refresh message 303 including a field indicating a variable name. In the example of FIG. 3, the variable name indicates IMSI 241. In response to the refresh command, the baseband processor 220 sends a request 304. In general, a request such as 304 to an SE may indicate which variables in an elementary file system of a SIM (such as SIM 240) are intended to be read. More information on refresh commands can be found in 3GPP 31.111. Request 304, in some embodiments, includes a nonce. SE 230 composes a payload 305 including the IMSI value of IMSI 241 and the nonce, and then signs over the payload using KS 234 to produce a signature 306. The SE 230 then sends the payload 305 and the signature 306 in the response 307. In general, a response such as 307 from an SE may be a binary stream. The baseband processor 220 observes a received signal and attempts validation, this activity is shown as validate 308 in FIG. 3. Based on successful validation, the baseband processor uses the SIM or profile for regular operations (event 309). Examples of regular (normal) operations are supporting voice or data services for the end user using the telecommunications network of the MNO associated with the SIM. If the validation fails, then the baseband processor maintains the status of the SIM as being in a restricted mode. Other messages may occur, not shown here. FIG. 3 illustrates baseband processor authenticating the message including SIM information, for example, IMSI 241.

Attack Scenario

FIG. 4 illustrates the device 201 in a scenario 400 in which subsidy lock is under attack. Only selected aspects of device 201 as shown in FIG. 2 are repeated in FIG. 4. An SE 430 is in the SIM card tray 205. An attacker has inserted proxy SIM 401 in the SIM card tray 205 between SE I/F 438 and tray I/F 204. The SE 430 may or may not be the same as the SE 230 of FIG. 2. A purpose of the attacker is to inject bogus signals into those signals observed by the baseband processor 220, and thereby defeat the subsidy lock. The proxy SIM 401 controls the aspects of signal 409 going toward the baseband processor 220 and injects the bogus signals as voltages or currents on to the tray I/F 204 at times related to attempted signaling between the baseband processor 220 and the SE 430. At other times, the proxy SIM 401 may observe the signals 408 from SE 430 and pass those through as signals 409. Similarly in the direction from the baseband processor 220 to the SE 430 the proxy SIM may pass signals 409 through as signals 408. The SE 430 has memory 432, OS 431, and signing function 433, and SIM functionality indicated as SIM 440. SIM 440 has an IMSI 441. The memory 432 includes a private key KS 434. The signing function 433, in some embodiments, signs, using the private key KS 434 over a payload including a nonce to produce a cryptographic signature. The proxy SIM 401 does not know the private key KS 434 and so is unable to fake operation of the signing function 433. The attacker is unable to both produce a confirmable signature and supply an IMSI corresponding to a valid contract. For example, if SE 430 is under the control the attacker, even if the attacker could learn the SIM private key and produce a valid signature, the IMSI corresponding to that private key would not be recognized by the MNO.

Attacker Logic

Figure 5:
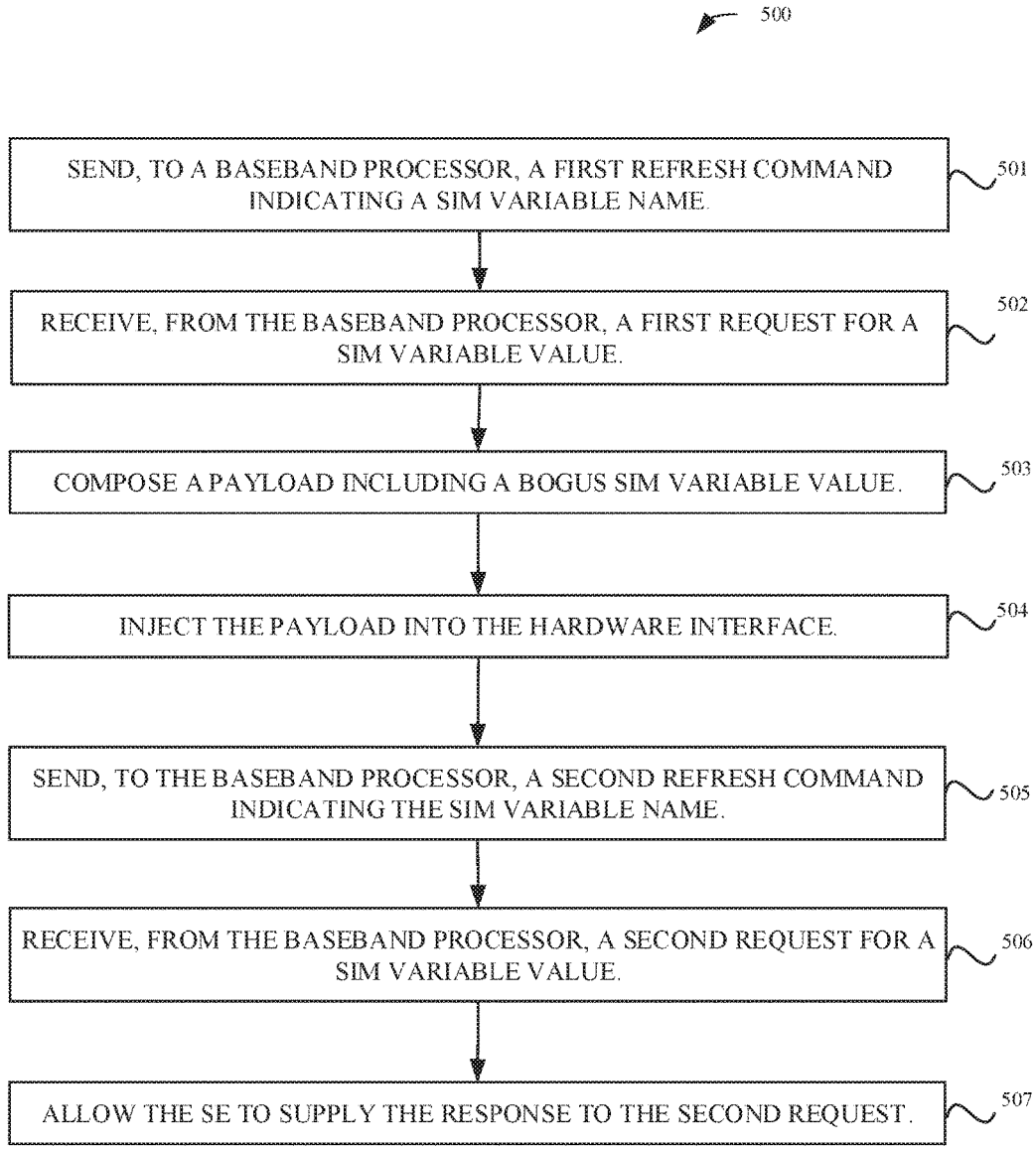
FIG. 5 illustrates a sequence of events in which the attacker attempts to break a subsidy lock associated with the device of FIG. 4.

FIG. 5 illustrates the attacker logic 500. This figure is provided to illustrate the attack, so that the efficacy of the embodiments provided herein (not in FIG. 5) is apparent. That is, embodiments described herein guard against logic 500. At 501, the proxy SIM 401 sends a refresh command indicating a SIM variable name, for example, a value indicating the variable name, "IMSI." At 502, the proxy SIM 401 observes a request for, for example, the IMSI variable value. At 503, the proxy SIM 401 composes a payload including a bogus SIM variable value. The proxy SIM 401 expects that locking software, which enforces subsidy lock in the device 201, will accept the bogus SIM variable value as being within the service contract terms that the device 201 was sold under. At 504, the proxy SIM 401 injects the payload into the hardware interface, for example, tray I/F 204 of FIG. 4. In some cases, the device 201 now considers the SE 430 with SIM 440 to be qualified under the service contract that the device 201 was sold under. At 505, the proxy SIM 401 sends a second refresh command, for example, again indicating the variable name, "IMSI." At 506, the baseband processor again selects the IMSI variable for reading. At 507, the proxy SIM 401 allows the SE 430 to supply the IMSI variable value associated with IMSI 441 of SIM 440. IMSI 441 is not an IMSI for which a valid contract exists. Unfortunately, because the device 201 has qualified SIM 440 as being contract compliant, the IMSI 441 can be used by the device 201 for activation with the contracting MNO and device 201 can be used by the end user with the wireless network of the contracting MNO, but without having signed a service contract.

Detailed Logic of Authentication by Baseband Processor

Figure 6:
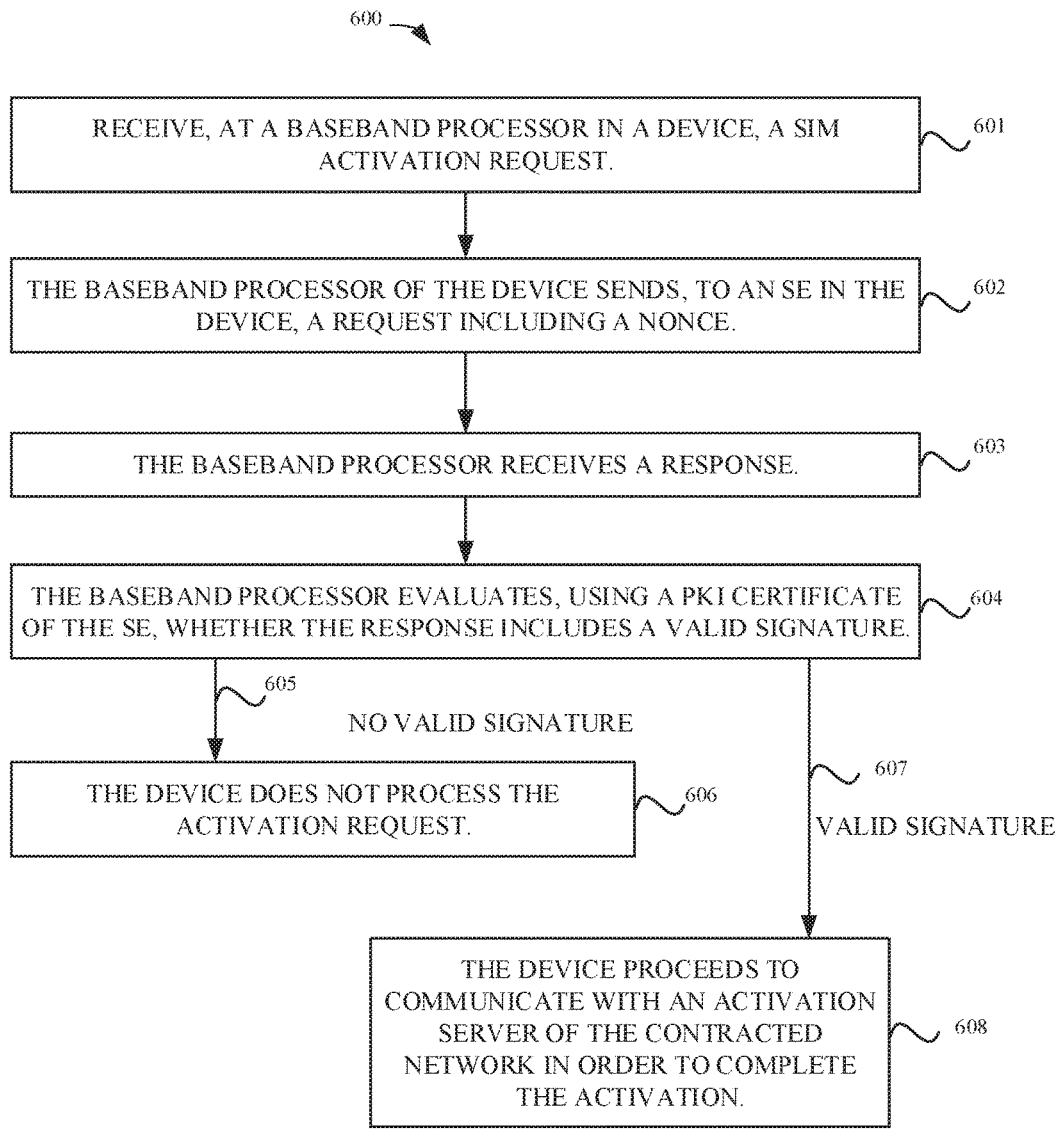
FIG. 6 illustrates exemplary logic in which a processor of the device evaluates a response, according to some embodiments.

FIG. 6 illustrates exemplary logic 600 for a baseband processor to guard against a subsidy lock attack, according to some embodiments. At 601, an activation request is received at a baseband processor. 601 may be triggered, for example, by an input received via the user interface 202. At 602, the baseband processor requests information from an SE in the device to determine whether the SE is in compliance with the contract terms. The request includes a nonce. At 603, the baseband processor receives a response. The baseband processor of the logic 600 presumes that the response may have been tampered with. At 604, the baseband processor evaluates, using a PKI certificate of the SE (including, for example, the public key KP 435 of the SE 430), whether the response includes a valid signature. If no valid signature is found, the logic flows via 605 to 606. At 606, the device does not process the activation request because a valid signature was not found. On the other hand, if a valid signature is found, the logic flows via 607 to 608. The device proceeds to communicate with an activation server of the contracted network in order to complete the requested activation.

SIM Information

Figure 7:
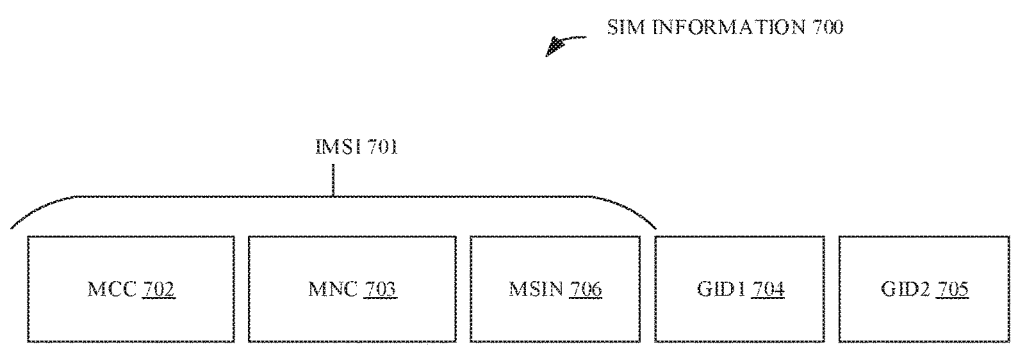
FIG. 7 illustrates exemplary SIM information, according to some embodiments.

FIG. 7 illustrates exemplary SIM information 700 that, in some embodiments, is used in verifying subsidy lock compliance. One or more of the values, or parts of the values, of the information types are used, in some embodiments, to evaluate whether an SE with a SIM functionality is qualified to comply with a service contract of a given device. For example, the request at 602 in logic 600, in some embodiments, requests one or more of the values illustrated in FIG. 7. FIG. 7 illustrates IMSI 701, mobile country code (MCC) 702, mobile network code (MNC) 703, mobile subscription identification number (MSIN) 706, group identifier level 1 (GID1) 704, and group identifier level 2 (GID2) 705. The IMSI consists of the MCC, the MNC, and the MSIN. The MCC identifies a country; more than one MCC may be assigned to a country. The MNC, in combination with the MCC, identifies a home network. The MSIN is administered by the relevant operator and can identify individual subscriptions.

Activation Ticket

Figure 8:
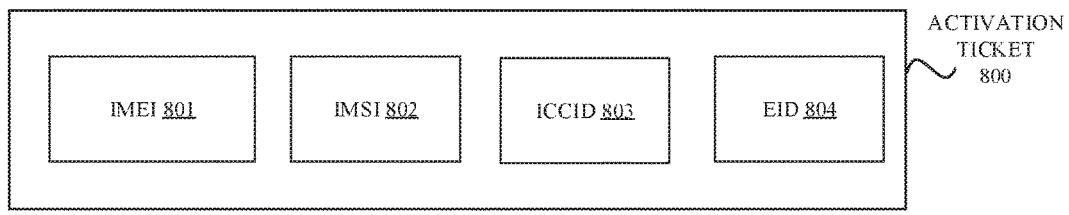
FIG. 8 illustrates an exemplary activation ticket, according to some embodiments.

FIG. 8 illustrates an exemplary activation ticket that is used by the activation server, according to some embodiments. For example, at 608 in the logic 600, the activation server 270 may use an activation ticket with one or more of the fields shown in FIG. 8. The activation ticket 800 includes the fields IMEI 801 (identifying the device 201), IMSI 802 (associated with SIM functionality, for example, SIM 240 or SIM 440), ICCID 803 (identifying SIM functionality, for example, identifying SIM 240 or SIM 440), and EID 804. EID 804 indicates an identifier (of some type) of the SE 230 or 430 provided in the activation ticket 800, in some embodiments.

Additional Baseband Authentication Logic

Figure 9:
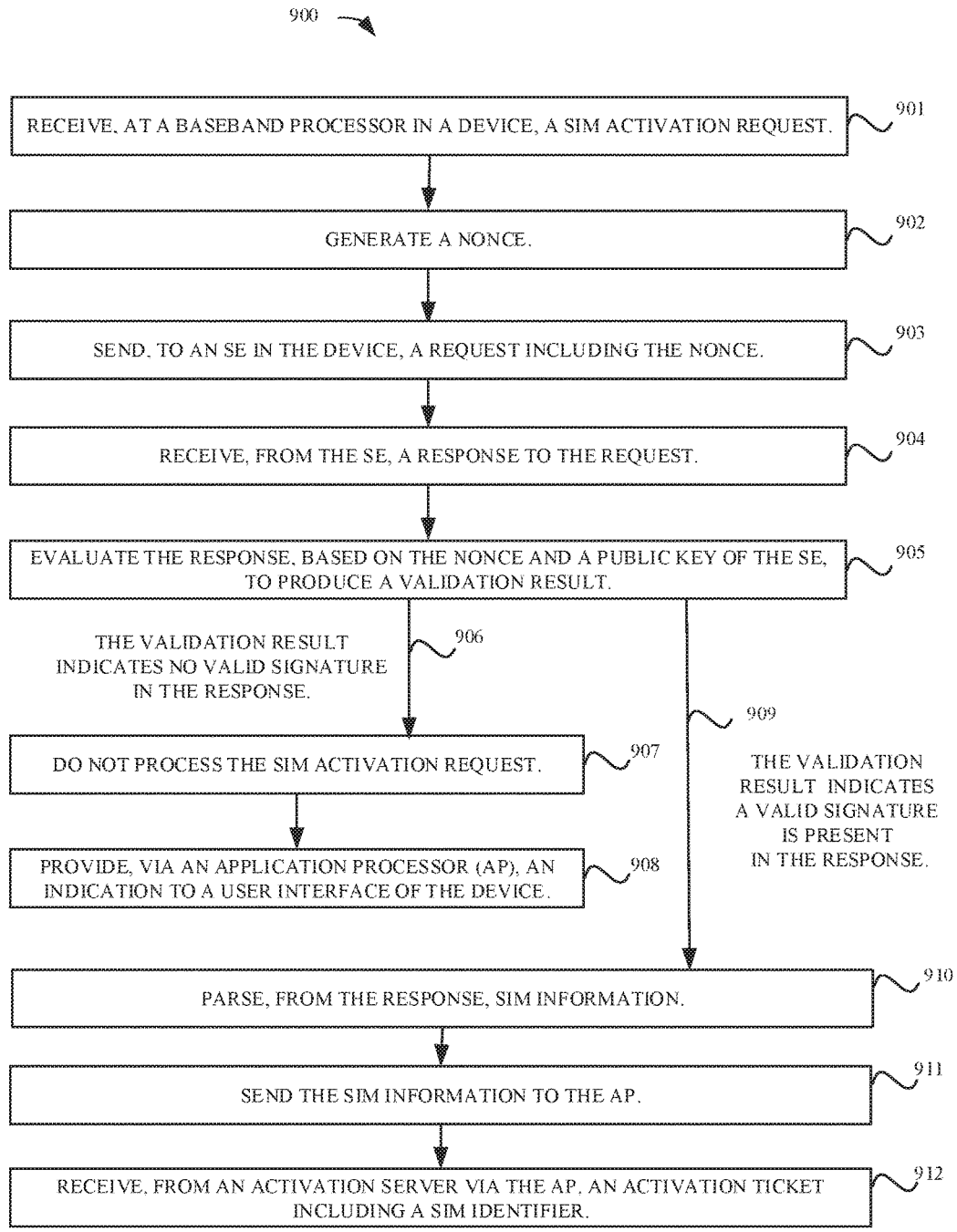
FIG. 9 illustrates exemplary logic for a baseband processor guarding against a proxy SIM attack, according to some embodiments.

FIG. 9 illustrates exemplary logic 900 for guarding against a proxy SIM attack, according to some embodiments. At 901, a baseband processor in a device housing an SE receives a SIM activation request. At 902, the baseband processor generates a nonce. At 903, the baseband processor sends, to an SE in the device, the nonce along with a request for SIM information. At 904, the baseband processor observes a response. At 905, the baseband processor evaluates the response based on the nonce and based on the public key of the SE and produces a validation result. If the validation result indicates that no valid signature is present in the response, the logic flows via 906 to 907. At 907, the baseband processor stops processing the validation request, and at 908 an indication is provided on the user interface. If the validation response indicates a valid signature is present in the response, the logic flows via 909 to 910. At 910, the baseband processor parses from the response, SIM information. At 911, the baseband processor sends some or all of the parsed SIM information to the AP in the device. At 912, the baseband processor receives from an activation server via the AP, an activation ticket including a SIM identifier. In some embodiments, when the validation result indicates a valid signature, the baseband processor then uses a SIM identified by the SIM identifier for regular cellular operations.

Message Flow Including Activation Server

Figure 10:
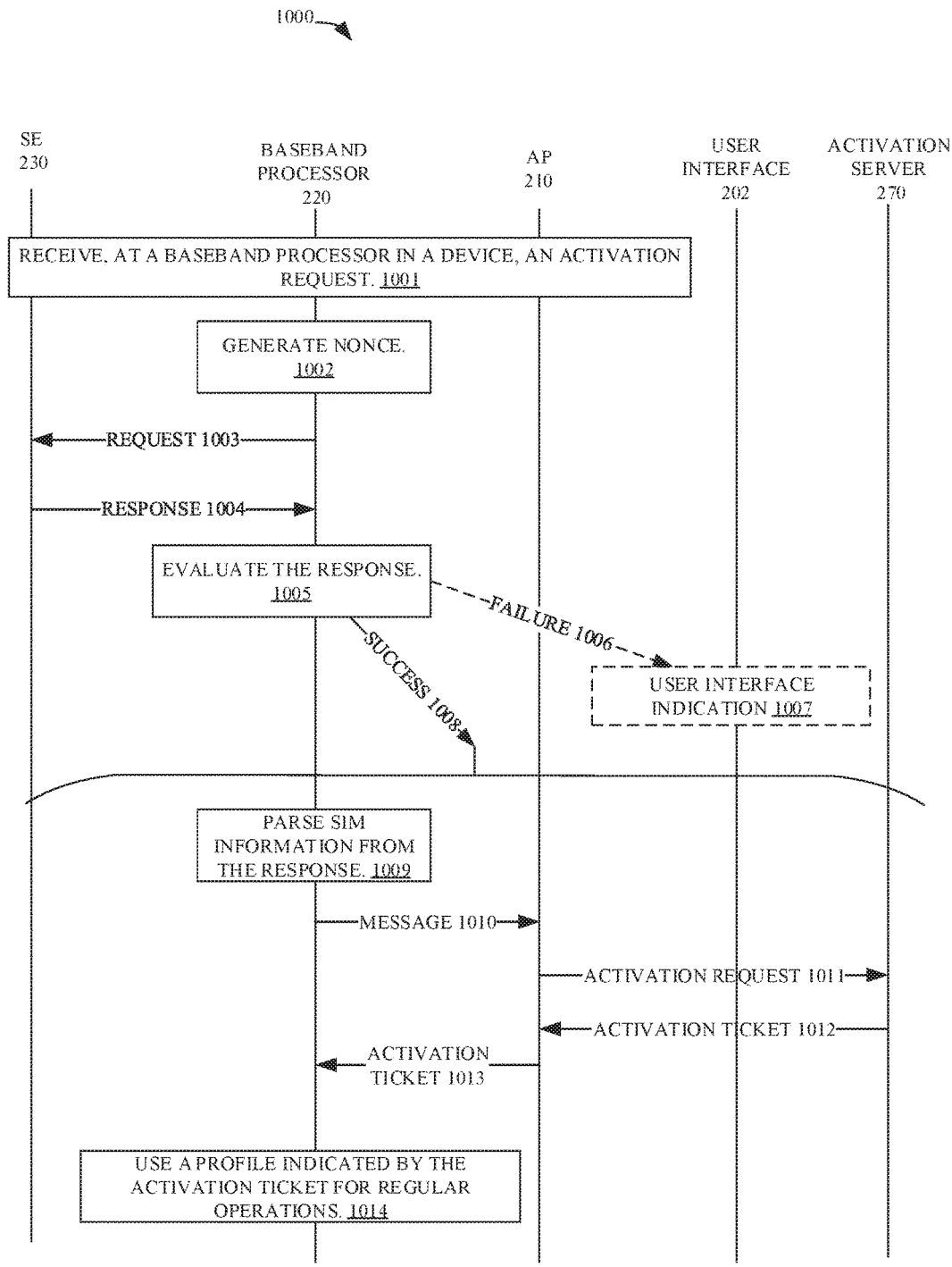
FIG. 10 illustrates an exemplary message flow, corresponding to the logic of FIG. 9, for guarding against a proxy SIM attack, according to some embodiments.

FIG. 10 illustrates an exemplary message flow 1000, according to some embodiments. The message flow begins with an activation event 1001. Activation event 1001 may be triggered, for example, by an input received via the user interface 202. Then baseband processor 220 generates a nonce, shown as action 1002. Next, the baseband processor 220 sends a request 1003 seeking SIM information, such as the information shown in FIG. 7. An example of request 1003 is a select command, modified to convey the nonce. More information on select commands can be found in ETSI 102.221. The SE 230 responds with signed SIM information and the nonce. The baseband processor 220 then evaluates the response, shown as event 1005. If a valid signature is not found or the nonce is not found in the response 1004, then the message flow indicates by the dashed arrow ("failure") 1006 that an event results in providing a user interface indication, indicated as reference numeral 1007 in FIG. 10. If a valid signature and the nonce are found in the response 1004, then the balance of the message flow 1000 follows the solid arrow ("success") 1008. Specifically, the baseband processor 220 parses SIM information from the response 1004; this event is marked with reference numeral 1009. Then a message 1010 is sent to the AP 210. The message 1010 includes some or all of the SIM information parsed from the response 1004. The AP 210 then sends activation request 1011 to the activation server 270 and receives back activation ticket 1012. Activation ticket 1012, in some embodiments, includes one or more of the fields illustrated in FIG. 8. AP 210 forwards the activation ticket to the baseband processor 220, shown in FIG. 10 as activation ticket 1013. Based on the activation ticket 1013, the baseband processor 220 proceeds to use the profile for regular cellular operations as indicated by event 1014.

Activation Server Logic

Figure 11:
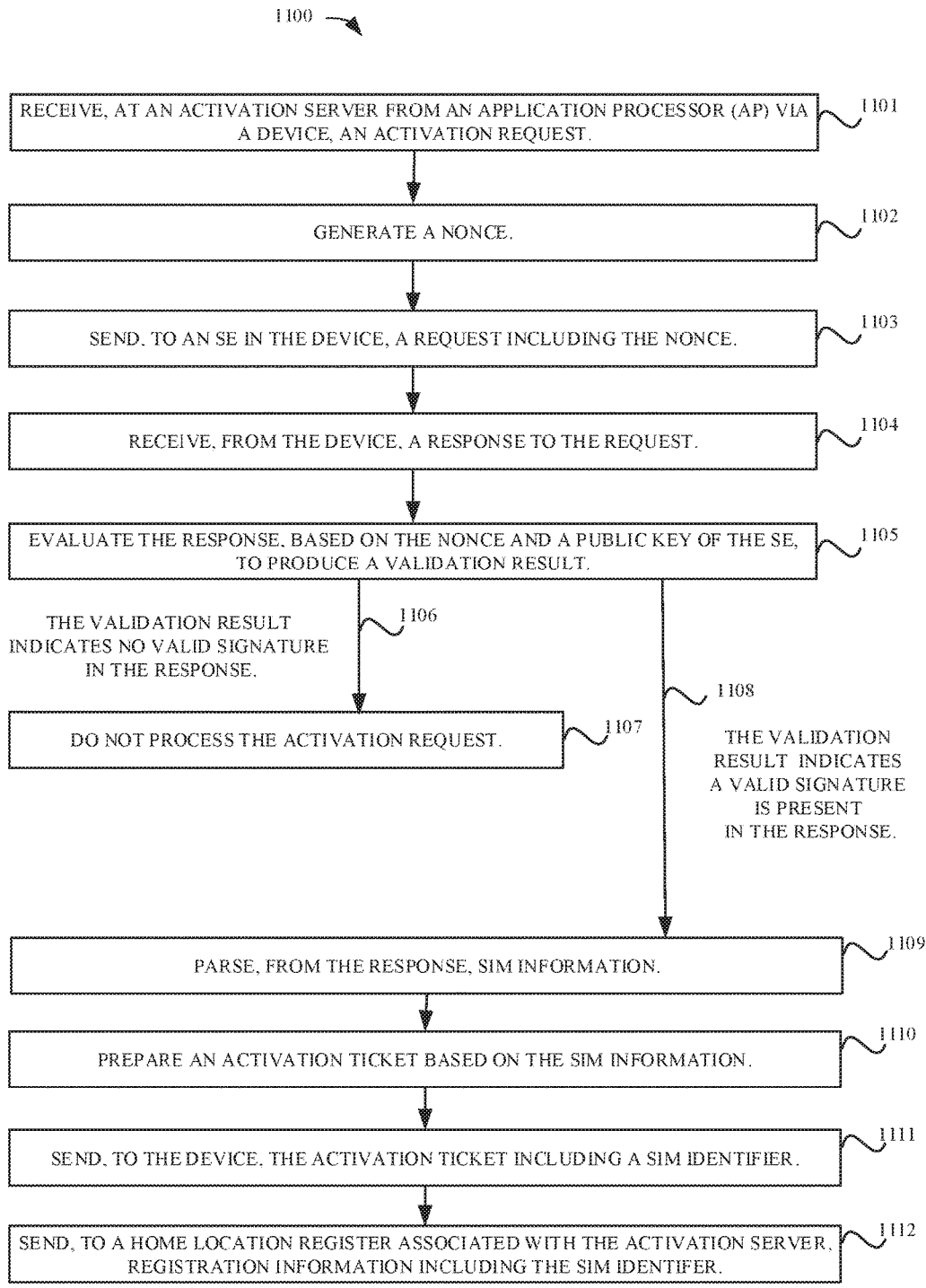
FIG. 11 illustrates exemplary logic for an activation server guarding against a proxy SIM attack, according to some embodiments.

Exemplary logic 1100 of FIG. 11 illustrates activation server 270 guarding against a subsidy lock attack, according to some embodiments. At 1101, an activation server receives from an AP in a device housing an SE, an activation request. At 1102, the activation server generates a nonce. At 1103, the activation server sends, to an SE in the device, a request including the nonce. At 1104, the activation server receives a response to the request. At 1105, the activation server evaluates the response based on a public key of the SE and produces a validation result. If the validation result indicates that the response does not hold a valid signature, the logic flows via 1106 to 1107, and the activation server stops processing of the activation request. If the validation results indicates a valid signature is present in the response, then the logic flows via 1108 to 1109. At 1109, the activation server parses from the response, SIM information, such as that shown in FIG. 7. In exemplary logic 1100, it is assumed that the SIM information is associated with a valid service contract. At 1110, the activation server prepares, based on the SIM information, an activation ticket, such as the one shown in FIG. 8. At 1111, the activation server sends to the device the activation ticket (see FIG. 8 for example activation ticket fields), including a SIM identifier such as ICCID 803. At 1112, the activation server sends to a home location register (HLR) associated with the activation server, registration information including the SIM identifier.

In some embodiments, exemplary server logic 1100 is realized as the following method. The method includes receiving, from an AP via a device, an activation request, wherein the device houses an SE, and a subscriber identity module (SIM) is present on the SE; generating a nonce; sending to the SE, via the device, a first request comprising the nonce; receiving, from the device and responsive to the first request, a first response, wherein: i) the first response comprises a payload, ii) the payload comprises information associated with the SIM, and iii) the first response comprises a cryptographic signature; and validating the cryptographic signature to produce a validation result, wherein the validating the cryptographic signature is based on: i) the nonce, and ii) a public key of the SE. The method then proceeds to branch, depending on the validation result. When the validation result indicates that the cryptographic signature is not correct, the method includes sending the AP a second response, wherein the second response indicates a failed activation request. However, when the validation result indicates that the cryptographic signature is correct, the method proceeds to perform sending an activation ticket to the AP, wherein the activation ticket is based on the information associated with the SIM.

Overall Message Flow for Subsidy Lock Enforcement

Figure 12:
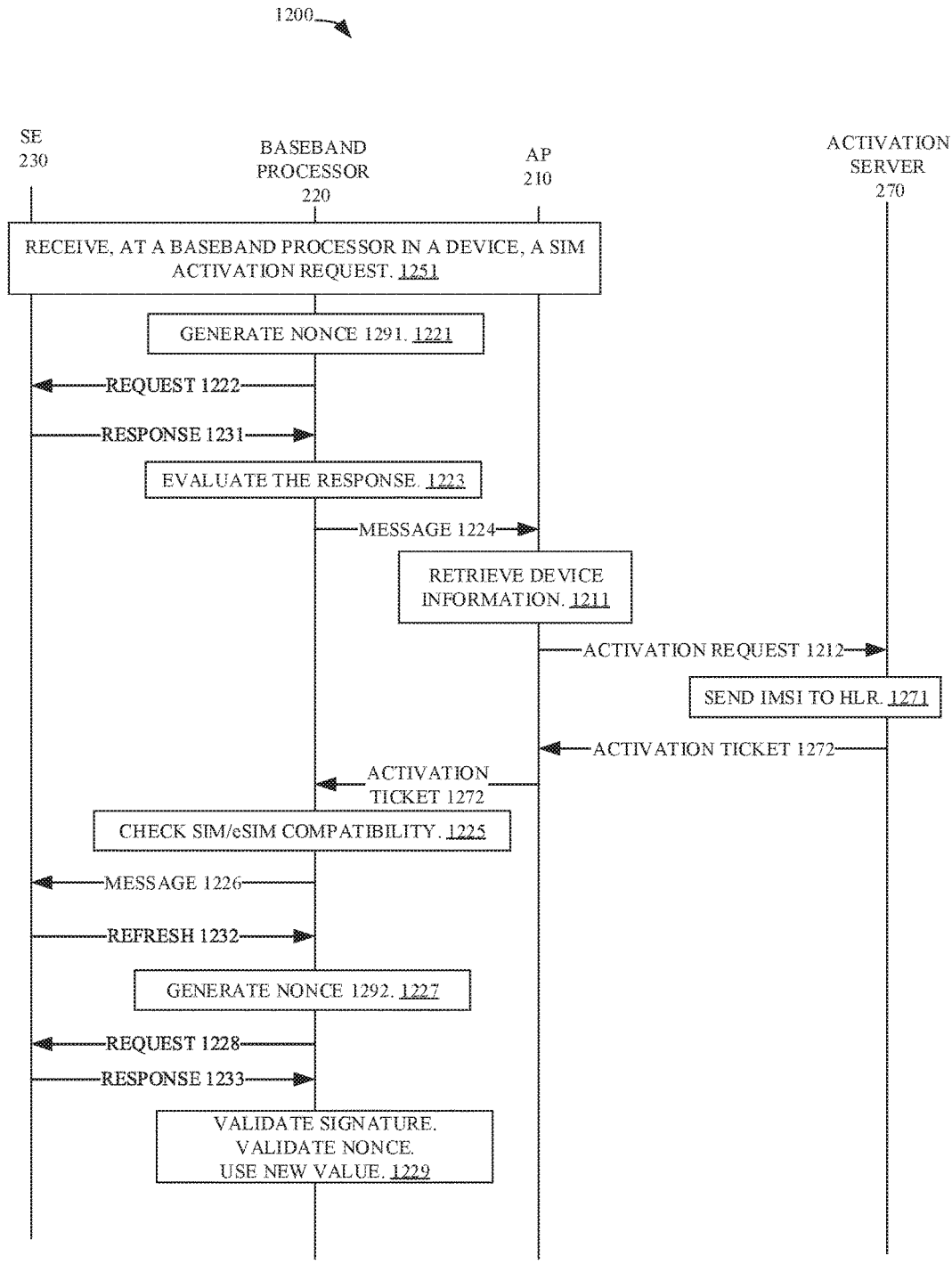
FIG. 12 illustrates an exemplary message flow showing a baseband processor guarding against a proxy SIM attack, according to some embodiments.

FIG. 12 illustrates an exemplary message flow 1200, according to some embodiments. Event 1251 is an activation event. Event 1251 may be triggered, for example, by an input received via the user interface 202. The baseband processor 220 generates nonce 1291 at event 1221, and then sends request 1222 to the SE 230. The request 1222 can be a select command, which includes the nonce 1291. The SE 230 sends back response 1231 which can be obtained by the baseband processor 220 using a read binary command. More information on read binary commands can be found in ETSI 102.221. The response 1231 includes the nonce, SIM information such as that shown in FIG. 7, and a signature over the nonce and SIM information. Event 1223 corresponds to the baseband processor 220 evaluating the response 1231. In particular, the baseband processor 220 validates the signature using the public key of the SE 230 and compares the received nonce with the nonce 1291. In the example of FIG. 12, the received nonce and signature are correct and the logic of baseband processor 220 deems the received SIM information trustworthy.

The baseband processor then sends message 1224 to the AP 210. Message 1224 includes the SIM information obtained from the response 1231. At event 1211, the AP 210 retrieves device information, for example, the IMEI of the device and then sends activation request 1212 to the activation server 270. At event 1271, the activation server registers the device, for example, by sending the IMSI value from the activation request to the HLR associated with the activation server 270. The activation server 270 then sends activation ticket 1272 to the AP 210. In some embodiments, the activation ticket 1272 includes one or more of the fields shown in the activation ticket 800 of FIG. 8. During event 1225, the baseband processor 220 checks the compatibility of the device 201 and/or the SE 230 with the SIM functionality (SIM/eSIM) of the SIM identified in the response 1231. More information on compatibility can be found in SGP.22. Message 1226 is then sent to the SE 230. SE 230 then sends proactive eUICC message refresh 1232 to the baseband processor 220. The baseband processor 220 then generates nonce 1292 during the event 1227, and sends an information request with the nonce 1292 in the request 1228. The SE 230 responds with the response 1233 including a nonce, information requested (such as that shown in FIG. 7) and a signature. The baseband processor 220, during the event 1229, validates the signature, validates the nonce, and uses the new SIM information value or values.

The message flow 1200 can be realized by a device using the following method. The method includes receiving, via an AP of the device, an input, wherein the input indicates a SIM (SIM functionality on an SE of the device, possibly realized using an eSIM) is to be activated; generating a first nonce; sending to the SE a first request comprising the first nonce; receiving a first response, wherein: i) the first response comprises a first payload, ii) the first payload comprises first information associated with the SIM, and iii) the first response comprises a first cryptographic signature; and validating the first cryptographic signature to produce a first validation result, wherein the validating the first cryptographic signature is based on: i) the first nonce, and ii) a public key of the SE. The method then branches conditioned on the validation result. When the first validation result indicates that the first cryptographic signature is not correct, the method includes providing, via the AP, a first indication on a user interface.

However, when the first validation result indicates that the first cryptographic signature is correct, the method proceeds to perform: a) sending the first information associated with the SIM to the AP, b) receiving an activation ticket from an activation server via the AP, c) determining that the activation ticket is compatible with the SIM, d) sending to the SE a second request, wherein the second request comprises a command to enable the SIM, e) receiving a refresh command from the SE, wherein the refresh command comprises second information associated with the SIM, f) generating a second nonce, g) sending to the SE a third request comprising the second nonce, h) receiving a second response, wherein: 1) the second response comprises a second payload, 2) the second payload comprises third information associated with the SIM, and 3) the second response comprises a second cryptographic signature. After receiving the second response, the method proceeds to performing validating the second cryptographic signature to produce a second validation result, wherein the validating the second cryptographic signature is based on 1) the second nonce, and 2) the public key of the SE. Finally, when the second validation result indicates that the second cryptographic signature is correct, the method proceeds to performing using the second information associated with the SIM at the baseband processor and at the AP.

In some realizations of the method, the first information associated with the SIM comprises an IMSI, an ICCID, GID1, and/or a GID2.

In some realizations of the method, the second information comprises an IMSI, an ICCID, GID1, and/or a GID2.

Example Device Connections

Figure 13:
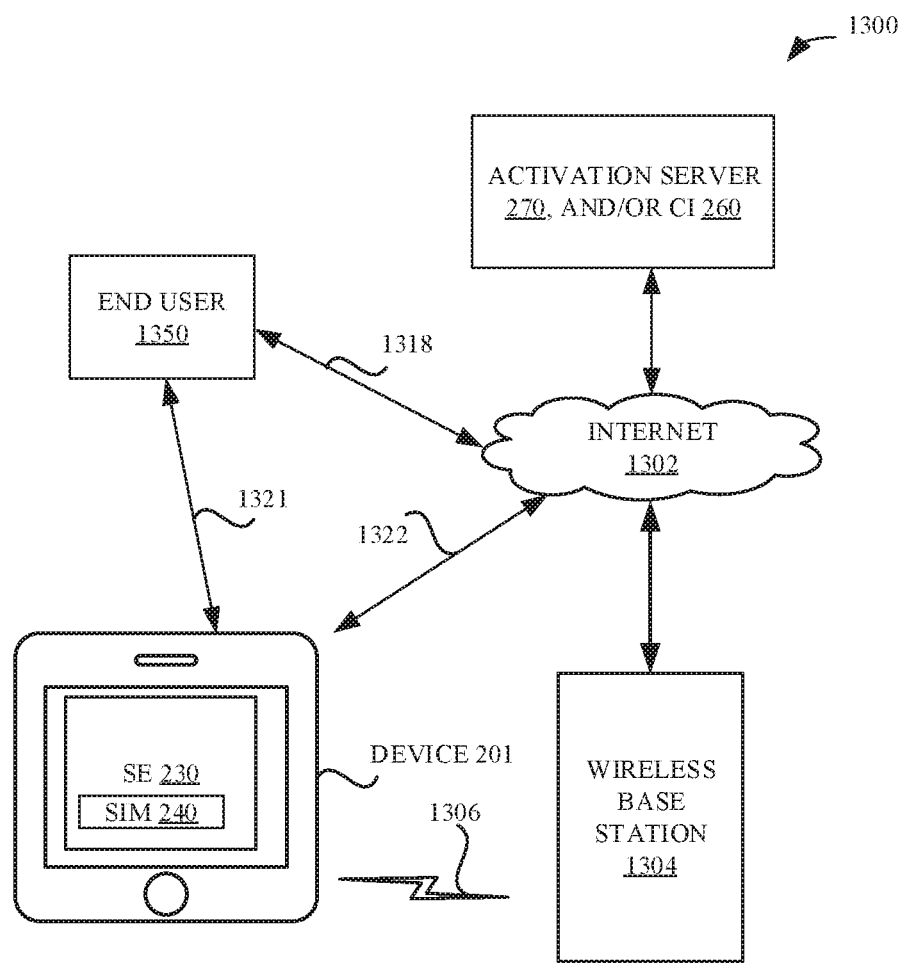
FIG. 13 illustrates exemplary connection methods of the wireless device of FIGS. 2 and 4, according to some embodiments.

FIG. 13 illustrates example connection methods for guarding against an attack against subsidy lock in a system 1300. End user 1350 can manage device 201 using interface 1321 which can support user interface inputs. The end user 1350 can also remotely manage device 201 via the Internet 1302 using interface 1318. The device 201 is shown connected to a wireless base station 1304 by a wireless link 1306 or to the Internet 1302 via a wired connection 1322. The wireless base station 1304 can be an Institute of Electronic and Electrical Engineers 802.11 Wireless Fidelity (IEEE 802.11 Wi-Fi) access point (AP) or the wireless base station 1304 can be, for example, a cellular mobile network base station. Examples of cellular mobile network base stations are a 2G or 3G base station or an LTE eNode B. Activation server 270 and CI 260 can communicate with device 201 and/or the SE 230 via the Internet 1302.

Wireless devices, and mobile devices in particular, can incorporate multiple different radio access technologies (RATs) to provide connections through different wireless networks that offer different services and/or capabilities. A wireless device can include hardware and software to support a wireless personal area network ("WPAN") according to a WPAN communication protocol, such as those standardized by the Bluetooth® special interest group ("SIG") and/or those developed by Apple referred to as an Apple Wireless Direct Link (AWDL). The wireless device can discover compatible peripheral wireless devices and can establish connections to these peripheral wireless devices located in order to provide specific communication services through a WPAN. In some situations, the wireless device can act as a communications hub that provides access to a wireless local area network ("WLAN") and/or to a wireless wide area network ("WWAN") to a wide variety of services that can be supported by various applications executing on the wireless device. Thus, communication capability for an accessory wireless device, e.g., without and/or not configured for WWAN communication, can be extended using a local WPAN (or WLAN) connection to a companion, or primary, wireless device that provides a WWAN connection. Alternatively, the accessory wireless device can also include wireless circuitry for a WLAN connection and can originate and/or terminate connections via a WLAN connection. Whether to use a direct connection or a relayed connection can depend on performance characteristics of one or more links of an active communication session between the accessory wireless device and a remote device. Fewer links (or hops) can provide for lower latency, and thus a direct connection can be preferred; however, unlike a legacy circuit-switched connection that provides a dedicated link, the direct connection via a WLAN can share bandwidth with other wireless devices on the same WLAN and/or with the backhaul connection from the access point that manages the WLAN. When performance on the local WLAN connection link and/or on the backhaul connection degrades, a relayed connection via a companion wireless device can be preferred. By monitoring performance of an active communication session and availability and capabilities of associated wireless devices (such as proximity to a companion wireless device), an accessory wireless device can request transfer of an active communication session between a direction connection and a relayed connection or vice versa.

In accordance with various embodiments described herein, the terms "wireless communication device," "wireless device," "mobile device," "mobile station," "wireless station", "wireless access point", "station", "access point" and "user equipment" (UE) may be used herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless device, in some embodiments, can also operate as part of a wireless communication system, which can include a set of client devices, which can also be referred to as stations, client wireless devices, or client wireless devices, interconnected to an access point (AP), e.g., as part of a WLAN, and/or to each other, e.g., as part of a WPAN and/or an "ad hoc" wireless network, such as a Wi-Fi direct connection. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax; or other present or future developed IEEE 802.11 technologies.

Additionally, it should be understood that the wireless devices described herein may be configured as multi-mode wireless communication devices that are also capable of communicating via different third generation (3G) and/or second generation (2G) RATs. In these scenarios, a multi-mode wireless device or UE can be configured to prefer attachment to LTE networks offering faster data rate throughput, as compared to other 3G legacy networks offering lower data rate throughputs. For instance, in some implementations, a multi-mode wireless device or UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Representative Exemplary Apparatus

Figure 14:
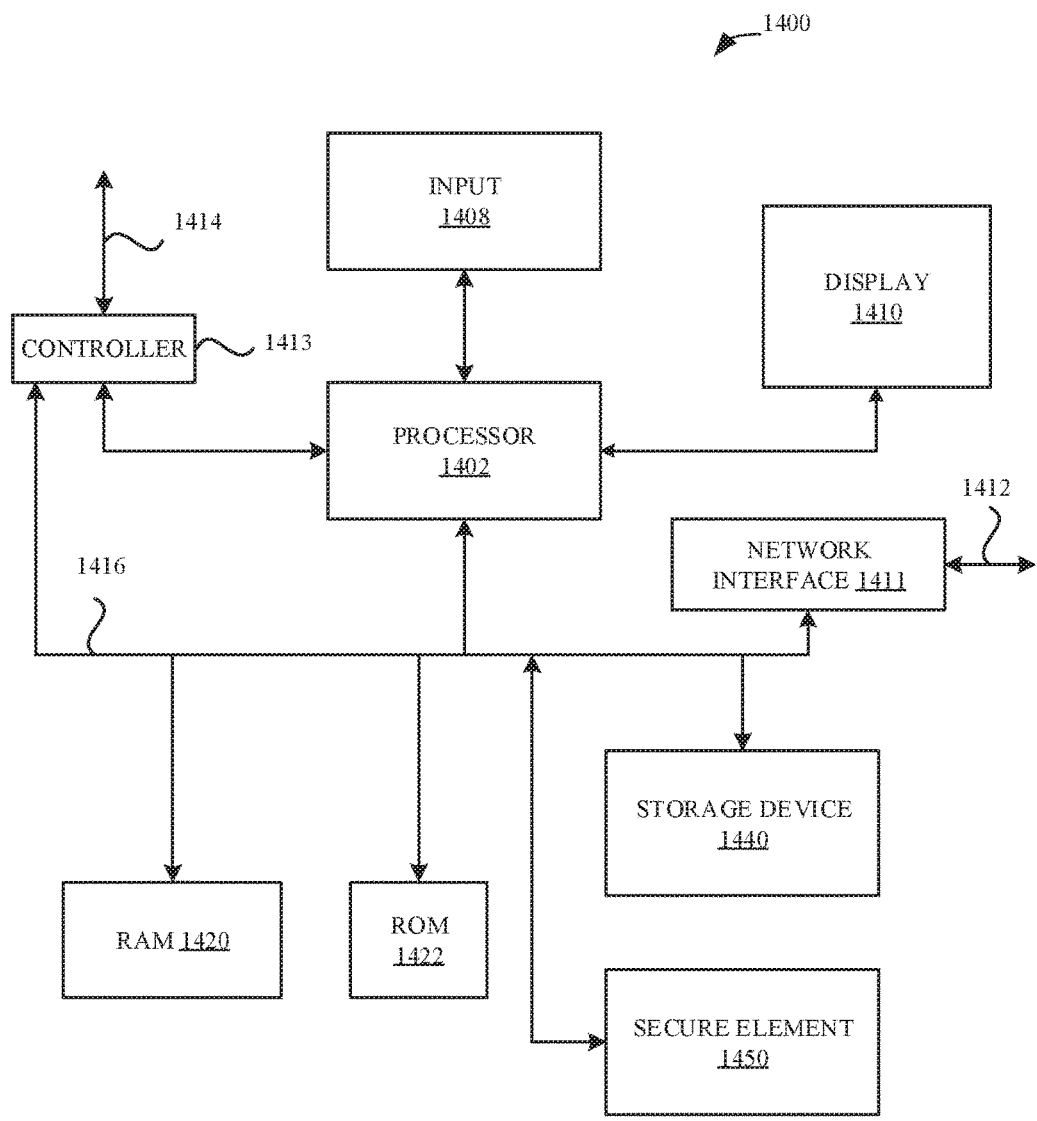
FIG. 14 illustrates an exemplary apparatus for implementation of the embodiments disclosed herein, according to some embodiments.

FIG. 14 illustrates in block diagram format an exemplary computing device 1400 that can be used to implement the various components and techniques described herein, according to some embodiments. In particular, the detailed view of the exemplary computing device 1400 illustrates various components that can be included in the device 201, the SE 230, the SE 240, and/or the activation server 270 illustrated in FIGS. 2, 4 and 13. As shown in FIG. 14, the computing device 1400 can include a processor 1402 that represents a microprocessor or controller for controlling the overall operation of computing device 1400. The computing device 1400 can also include a user input device 1408 that allows a user of the computing device 1400 to interact with the computing device 1400. For example, the user input device 1408 can take a variety of forms, such as a button, keypad, dial, touch screen, audio input interface, visual/image capture input interface, input in the form of sensor data, etc. Still further, the computing device 1400 can include a display 1410 (screen display) that can be controlled by the processor 1402 to display information to the user (for example, information relating to incoming, outgoing, or active communication session). A data bus 1416 can facilitate data transfer between at least a storage device 1440, the processor 1402, and a controller 1413. The controller 1413 can be used to interface with and control different equipment through an equipment control bus 1414. The computing device 1400 can also include a network/bus interface 1411 that couples to a data link 1412. In the case of a wireless connection, the network/bus interface 1411 can include wireless circuitry, such as a wireless transceiver and/or baseband processor. The computing device 1400 can also include a secure element 1450. The secure element 1450 can include an eUICC or a UICC. In some embodiments, the computing device 1400 includes a baseband processor, one or more radio frequency (RF) transceivers and one or more antennas (not shown).

The computing device 1400 also includes a storage device 1440, which can comprise a single storage or a plurality of storages (e.g., hard drives), and includes a storage management module that manages one or more partitions within the storage device 1440. In some embodiments, storage device 1440 can include flash memory, semiconductor (solid state) memory or the like. The computing device 1400 can also include a Random Access Memory ("RAM") 1420 and a Read-Only Memory ("ROM") 1422. The ROM 1422 can store programs, utilities or processes to be executed in a non-volatile manner. The RAM 1420 can provide volatile data storage, and stores instructions related to the operation of the computing device 1400.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard storage drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method comprising:
    by a baseband processor of a device comprising an application processor (AP) and the baseband processor, wherein the device houses a secure element (SE) and subscriber identity module (SIM) functionality is present on the SE:
        receiving, via the AP, an input that triggers activation of the SIM functionality;
        generating a nonce after receiving the input;
        sending to the SE a first request comprising the nonce;
        receiving a response, wherein: i) the response comprises a payload, ii) the payload comprises information associated with the SIM functionality, and iii) the response comprises a cryptographic signature;
        when the cryptographic signature is not correct:
            providing, via the AP, a first indication on a user interface; and
        when the cryptographic signature is correct:
            sending the information associated with the SIM functionality to the AP.

2. The method of claim 1, further comprising:
    prior to the providing the first indication:
        determining that the cryptographic signature is not correct based on the nonce and a public key of the SE.

3. The method of claim 1, wherein an electronic SIM (eSIM) present on the SE includes the SIM functionality.

4. The method of claim 1, wherein the information associated with the SIM functionality comprises an international mobile subscriber identity (IMSI), an integrated circuit card identifier (ICCID), a group identifier level one (GID1), and/or a group identifier level two (GID2).

5. The method of claim 1, wherein the SE is an embedded universal integrated circuit card (eUICC).

6. The method of claim 1, further comprising:
    subsequent to the sending the information associated with the SIM functionality to the AP:
        receiving an activation ticket from an activation server via the AP, wherein the activation ticket comprises a SIM identifier.

7. The method of claim 6, wherein the activation ticket comprises an international mobile equipment identifier (IMEI), an international mobile subscriber identity (IMSI), and/or an integrated circuit card identifier (ICCID).

8. A device comprising:
    an application processor (AP);
    a baseband processor; and
    a memory storing instructions that are executable by the baseband processor and cause the baseband processor to perform operations comprising:
        receiving, via the AP, an input that triggers activation of the SIM functionality,
        generating a nonce after receiving the input,
        sending to a secure element (SE) housed in the device a first request comprising the nonce,
        receiving a response, wherein: i) the response comprises a payload, ii) the payload comprises information associated with subscriber identity module (SIM) functionality present on the SE, and iii) the response comprises a cryptographic signature,
        when the cryptographic signature is not correct:
            providing, via the AP, a first indication on a user interface, and when the cryptographic signature is correct:
sending the information associated with the SIM functionality to the AP.

9. The device of claim 8, wherein the operations further comprise: prior to the providing the first indication:
determining that the cryptographic signature is not correct based on the nonce and a public key of the SE.

10. The device of claim 8, wherein an electronic SIM (eSIM) present on the SE includes the SIM functionality.

11. The device of claim 8, wherein the information associated with the SIM functionality comprises an international mobile subscriber identity (IMSI), an integrated circuit card identifier (ICCID), a group identifier level one (GID1), and/or a group identifier level two (GID2).

12. The device of claim 8, wherein the SE is an embedded universal integrated circuit card (eUICC).

13. The device of claim 8, further comprising:
subsequent to the sending the information associated with the SIM functionality to the AP:
receiving an activation ticket from an activation server via the AP, wherein the activation ticket comprises a SIM identifier.

14. The device of claim 13, wherein the activation ticket comprises an international mobile equipment identifier (IMEI), an international mobile subscriber identity (IMSI), and/or an integrated circuit card identifier (ICCID).

15. A secure element (SE) comprising:
one or more processors; and
a memory storing instructions that are executable by a processor of the one or more processors and cause the SE to perform operations comprising:
sending, to a baseband processor in a device, a refresh command, wherein the refresh command comprises information associated with subscriber identity module (SIM) functionality present on the SE and wherein the SE is housed in the device,
receiving, from the baseband processor, a request comprising a nonce, wherein the nonce is generated by the baseband processor after receipt of an input that triggers activation of the SIM functionality,
composing a payload, wherein the payload comprises i) the nonce and ii) the information associated with the SIM functionality present on the SE,
signing the payload with a private key to produce a cryptographic signature, and
sending a response to the baseband processor, wherein the response comprises the payload and the cryptographic signature for the baseband processor to validate the response.

16. The SE of claim 15, wherein the operations further comprise:
receiving, from the baseband processor, a second request, wherein the second request comprises a command to enable the SIM functionality,
sending, to the baseband processor, a second refresh command, wherein the second refresh command comprises second information associated with the SIM functionality,
receiving, from the baseband processor, a second request comprising a second nonce,
composing a second payload, wherein the second payload comprises the second nonce,
signing the second payload with a public key to produce a second cryptographic signature, and
sending a second response to the baseband processor, wherein the second response comprises the second payload and the second cryptographic signature.

17. The SE of claim 15, wherein an electronic SIM (eSIM) present on the SE includes the SIM functionality.

18. The SE of claim 15, wherein the information associated with the SIM functionality comprises an international mobile subscriber identity (IMSI), an integrated circuit card identifier (ICCID), a group identifier level one (GID1), and/or a group identifier level two (GID2).

19. The SE of claim 15, wherein the SE is an embedded universal integrated circuit card (eUICC).

* * * * *